(12) United States Patent
Thielman

(10) Patent No.: US 6,454,978 B1
(45) Date of Patent: Sep. 24, 2002

(54) PROCESS FOR MAKING FUEL CELL PLATES

(75) Inventor: W. Scott Thielman, Palatine, IL (US)

(73) Assignee: Avery Dennison Corporation, Pasadena, CA (US)

( * ) Notice: Subject to any disclaimer, the term of this patent is extended or adjusted under 35 U.S.C. 154(b) by 37 days.

(21) Appl. No.: 09/596,241

(22) Filed: Jun. 16, 2000

(51) Int. Cl.⁷ .............. B29C 59/00; H01M 8/02
(52) U.S. Cl. .......... 264/104; 264/119; 264/293; 429/34
(58) Field of Search .............. 429/34; 264/104, 264/105, 119, 293

(56) References Cited

U.S. PATENT DOCUMENTS

| | | |
|---|---|---|
| 3,737,265 A | 6/1973 | Schafer et al. |
| 3,844,906 A | 10/1974 | Bailey et al. |
| 3,959,109 A | 5/1976 | Hambling et al. |
| 4,075,383 A * | 2/1978 | Anderson et al. ....... 264/119 X |
| 4,115,490 A | 9/1978 | Munk |
| 4,347,202 A | 8/1982 | Henckel et al. |
| 4,426,340 A | 1/1984 | Goller et al. |
| 4,432,916 A | 2/1984 | Logan |
| 4,438,053 A | 3/1984 | Banke et al. |
| 4,478,769 A * | 10/1984 | Pricone et al. |
| 4,486,363 A * | 12/1984 | Pricone et al. |
| 4,496,415 A | 1/1985 | Sprengling |
| 4,501,646 A | 2/1985 | Herbert |
| 4,601,861 A * | 7/1986 | Pricone et al. |
| 4,654,195 A * | 3/1987 | Wnuck et al. .......... 264/104 X |
| 4,664,758 A | 5/1987 | Grey |
| 4,781,799 A | 11/1988 | Herbert, Jr. et al. |
| 5,017,312 A | 5/1991 | Peters et al. |
| 5,073,219 A | 12/1991 | McArdle et al. |
| 5,160,421 A | 11/1992 | Melnyk et al. |
| 5,200,129 A | 4/1993 | Kobayashi et al. |
| 5,213,872 A * | 5/1993 | Pricone et al. |
| 5,266,257 A | 11/1993 | Kildune |
| 5,269,994 A * | 12/1993 | Deffenbaugh et al. ...... 264/119 |
| 5,284,546 A | 2/1994 | Tilby |
| 5,300,370 A * | 4/1994 | Washington et al. |
| 5,327,825 A | 7/1994 | Parker et al. |
| 5,498,309 A | 3/1996 | Greten et al. |
| 5,506,671 A | 4/1996 | Buts et al. |
| 5,521,018 A * | 5/1996 | Wilkinson et al. |
| 5,521,030 A | 5/1996 | McGrew |
| 5,773,160 A * | 6/1998 | Wilkinson et al. |
| 5,981,098 A * | 11/1999 | Vitale |
| 6,015,633 A * | 1/2000 | Carlson et al. |
| 6,197,235 B1 * | 3/2001 | Miller et al. ............ 264/119 X |

* cited by examiner

Primary Examiner—Stephen Kalafut
(74) Attorney, Agent, or Firm—Jones, Day, Reavis & Pogue

(57) ABSTRACT

A process for manufacturing fuel cell plates including a continuous press, a sifter, a leveler and rollers for removing air from resin impregnated graphite. The sifted material is deposited on a heated lower press belt having an embossing pattern. The material is leveled to a predetermined height and squeezed to remove air. An upper belt, also having an embossing pattern, contacts the material and heat and pressure are applied in a reaction zone for a predetermined time period. The finished product is a relatively low cost fuel cell plate.

5 Claims, 3 Drawing Sheets

PROCESS FOR MAKING FUEL CELL PLATES

BACKGROUND OF THE INVENTION

1. Field of the Invention

The present invention relates to the manufacture of fuel cell fluid flow plates with surface indentations, and more particularly, to the manufacture of such plates in a very efficient and cost effective manner.

2. Description of the Related Art

Fuel cells are electrochemical devices which directly combine hydrogen from a fuel and oxygen, usually from the air, to produce electricity and water. With prior processing, a wide range of fuels, including hydrogen, natural gas, methanol, gasoline and coal-derived synthetic fuels, can be converted to electric power. The basic process is highly efficient (80–90%), pollution-free, quiet, free from moving parts and may be constructed to leave only heat and water as by-products. Since single fuel cells can be assembled into stacks of varying sizes, systems can be designed to produce a wide range of energy output levels and thus satisfy numerous kinds of applications.

Fuel cell construction generally consists of a fuel electrode (anode) and an oxidant electrode (cathode) separated by an ion conducting layer. In operation, current is generated by a reaction on the electrode surfaces which are in contact with an electrolyte. Fuel and oxidant are supplied as required by the current load; and water is continuously removed. The electrode reactions are comprised of the oxidation of hydrogen on the anode to hydrated protons with the release of electrons. Stated in another way, the hydrogen gas molecules split into protons and electrons. On the cathode, the reaction is of oxygen with protons to form water vapor including a consumption of electrons. Electrons flow from the anode through the external load to the cathode and the circuit is closed by an ionic current transported through the electrolyte.

There are several different types of fuel cells under such labels as phosphoric acid, alkaline, molten carbonate, solid oxide and proton exchange membrane (PEM). The basic components of a PEM fuel cell are the two electrodes separated by a polymer membrane electrolyte. Each electrode is coated on one side with a thin platinum catalyst layer. The electrodes, catalyst and membrane together form a membrane electrode assembly. In a manner analogous to that described above, hydrogen fuel dissociates or splits into free electrons and protons in the presence of the platinum catalyst at the anode. The free electrons are conducted in the form of usable electric current through the external circuit. The protons migrate through the membrane electrolyte to the cathode. At the cathode, oxygen from air, electrons from the external circuit and protons combine to form pure water and heat. Individual fuel cells produce about 0.6 volts and are combined into a fuel cell stack to provide the amount of electrical power required.

Fuel cells may be used as stationary electric power plants in buildings and residences, as vehicle power sources in cars, buses and trucks and as portable power in video cameras, computers and the like.

A single fuel cell consists of a membrane electrode assembly and two fluid flow field plates. Hydrogen and air supplied to the electrodes on either side of the PEM through channels formed in the flow field plates. Hydrogen flows through the channels to the anode where the platinum catalyst promotes separation into protons and electrons. On the opposite side of the PEM, air flows trough the channels to the cathode where oxygen in the air attracts the hydrogen protons through the PEM. The electrons are captured as useful electricity through the external circuit and combine with the protons and oxygen to produce water vapor at the cathode side.

Reference is made to U.S. Pat. No. 5,300,370 ('370) issued in 1994 which describes a typical fuel cell fluid flow plate from 1984. The plate, in the form of a rigid electrically conductive panel, includes a plurality of parallel open-faced fluid flow channels formed in a major surface of the panel. The parallel channels extend between an inlet header and an outlet header formed in the panel. The parallel channels are typically rectangular in cross section and about 0.030 inches deep and about 0.030 inches wide. The inlet header is connected to an opening in the plate through which a pressurized reactant, either fuel or oxidant, is supplied. The outlet header is also connected to an opening in the plate through which the exhaust reactant and water are discharged from the cell. The reactant runs from the inlet to the inlet header and then to the parallel channels. The reactant then diffuses through a porous electrode material to the electro catalytically active region of the membrane electrode assembly. The reactant then flows to the outlet header and then to the outlet from which it is exhausted from the fuel cell. A plurality of continuous open-face fluid flow channels formed in the surface of the plate traverse the central area of the plate in a serpentine manner. This patent goes on to disclose that the fluid flow plates are made of graphite and the channels are milled, engraved or molded.

The '370 patent discloses a new fluid flow field plate construction consisting of a stencil layer and a separator layer. The separator and stencil layers are formed of flexible graphite foil sheets having a thickness between about 0.003 inches and about 0.030 inches. Another patent, U.S. Pat. No. 5,521,018 ('018), discloses the concept of embossing a fluid flow field plate such as electrically conductive graphite foil sheet material. Other materials being sufficiently soft so as to permit embossing include porous electrically conductive sheet materials, such as carbon fibre paper, corrosive resistant metals, such as niobium; somewhat corrosive resistant material, such as magnesium or copper particularly when plated with noble metals such as gold or platinum to render them unreactive; and composite materials composed of corrosive metal powder, a base metal powder plated with corrosive resistant metal, and/or other chemically inert electrically conductive powders such as graphite and boron carbide bonded together with a suitable binder to produce a compressible electrically conductive sheet material. The embossing step is accomplished using a die where the channels are generally U-shaped or V-shaped in cross section. The '018 patent discloses that "the graphite foil sheet is embossed at an embossing pressure sufficient to impart into the compressible sheet material, smooth-surface channels, of substantially uniform depth, and having a clean, reverse image of the embossing die. Different flow field patterns and plate sizes will require different embossing pressures. The bulk of the sheet material (that is, the portions of the sheet material located apart from the channels) can also be compressed during the embossing operation and the embossing pressure can be selected to provide the appropriate channel depth in cross sectional profile, and also to impart the appropriate electrical conductivity and porosity to the bulk material."

Still another U.S. Pat. No. 5,773,160 discloses the use of a coolant flow field plate in addition to a fuel flow field plate and an oxidant flow field plate. Yet another U.S. Pat. No.

5,981,098 ('098) issued in 1999 discusses fluid flow plates formed from a conductive material such as graphite where the flow channels are typically formed by machining. The patent also refers to an earlier fluid flow field plate comprising two outer layers of compressible electrically conductive material with an interposed center metal sheet. The outward faces of each of the two outer layers is embossed with flow field channels which are called "indentations". The '098 patent goes on to describe fluid flow plates made by forming foil or sheet material into a design similar to a corrugation. Forming is accomplished by passing the plates between two rollers having patterns to make the channel grooves of preselected pitch and depth. One foil material is described as stainless steel. In this case, the height of the corrugated layer is 0.065 inches, with 32 channels per inch and a sheet thickness of 0.008 inches where the channels are 0.066 inches wide and 0.065 inches in depth. The plates may also be formed by stamping thin stainless steel sheet stock where the sheets have dimensions of 8.32 inches in length, 9.55 inches in width and 0.004 inches thick. The stamping is occasioned by a hydro-forming process in which each sheet is placed between an open dye and a piece of rubber that seals a high pressure oil chamber. Hydraulic pressure on the oil causes the rubber to impress or stretch the sheet as desired.

Still another U.S. Pat. No. 6,015,633 issued this year, discloses a fluid flow field plate having a thickness within the range of 0.020 to 0.300 inches with a preference for the range of 0.050 to 0.150 inches, where the channels have a width in the range 0.010 to 0.100 inches with a preference for the range 0.020 to 0.050 inches and a channel depth within the range 0.002 to 0.050 inches with a preference for the range of 0.010 to 0.040 inches. In addition, the cross sectional dimension of the width of the land separating adjacent channels is in the range of 0.010 to 0.100 inches and preferably within the range of 0.020 to 0.050 inches. The plate is described as a laminate with a generally non-porous planar base under a generally porous elongated strip. The non-porous portion may be comprised of a metallic material, such as stainless steel, or of a resin impregnated graphite material. The porous portion may be a wickey material, such as cotton cheese cloth. All of the above mentioned patents are incorporated herein by reference as are the references disclosed in each of them.

Methods and apparatus for embossing precision optical patterns in a resinous sheet or laminate is also well known, as referenced in such U.S. Pat. No. 4,486,363; 4,478,769; 4,601,861; 5,213,872; and 6,015,214 which patents are all incorporated herein by reference. By way of example, thin flexible thermoplastic material may be embossed with precision patterns where flatness and angular accuracy are very important. Products that require such accuracy include, for example, retroreflective materials for road reflectors or signage. As described in the above mentioned patents, the sheeting may be made on a machine that includes two supply reels, one containing an unprocessed web of thermoplastic material, such as acrylic or polycarbonate or even vinyl and the other containing a transparent plastic carrier film such as Mylar. These are fed to an embossing tool which may take the form of a thin endless metal belt.

The belt moves around two rollers which advance the belt at a predetermined linear speed or rate. One of the rollers is heated and the other roller is cooled. An additional cooling station may be provided between the two rollers. Pressure rollers are arranged about a portion of the circumference of the heated roller. Embossing occurs on the web as it passes around the heated roller and while pressure is applied. The embossed, now laminated sheeting, is monitored for quality and then moved to a storage winder. Before shipping the Mylar film may be stripped away from the embossed film.

The embossing tool may be made by electroforming as described in U.S. Pat. Nos. 4,478,769 and 6,015,214. The design to be embossed on the sheeting begins by forming the design on specific plates made of one of a number of specified materials including electroless nickel. These plates are replicated to produce a flexible strip having an uninterrupted pattern. The strips are assembled on a cylindrical mandrel to provide cylindrical segments. The cylindrical segments are assembled to provide a cylinder of the desired dimensions corresponding to the width of the web intended to be provided with rectroreflective elements. The assembled cylinder is used to form a flexible endless master cylinder having the pattern of microcubes. The master cylinder is then used to form a relatively thick mother cylinder which in turn is used to form a generally cylindrical metal embossing tool.

The embossing tool may then be used to emboss the microcubes on a surface of a continuous resinous sheeting material to manufacture a rectroreflective sheeting article as described in U.S. Pat. No. 4,486,363 which has been briefly described hereinabove.

Continuous press machines are also well known. These include double band presses which have continuous flat beds with two endless bands or belts, usually steel, running above and below the product and around pairs of upper and lower drums or rollers. These form a pressure or reaction zone between the two belts and have the advantage that pressure is applied to a product when it is flat rather than when it is in a curved form. The double band press also allows pressure to vary over a wide range and the same is true about temperature variability. Dwell time or time under pressure is also easily controllable by varying the production speed or rate, as is capacity which may be changed by varying speed and/or length of the press.

In use, the product is "grabbed" by the two belts and drawn into the press at a constant speed. At the same time, the product, when in a relatively long flat plane, is exposed to pressure in a direction normal to the product. Of course, friction is substantial on the product but this may be overcome by one of three systems. One system is the gliding press, where pressure-heating plates are covered with low-friction material such as polytetrafluorethylene and lubricating oil. Another is the roller bed press, where rollers are placed between the stationary and moving parts of the press. The rollers are either mounted in a fixed position on the pressure plates or incorporated in chains or roller "carpets" moving inside the belts in the same direction but at half speed. The roller press is sometimes associated with the term "isochoric". This is due to the press providing pressure by maintaining a constant distance between the two belts where the product is located. Typical isochoric presses operate to more than 700 psi.

The third press type is the fluid or air cushion press which uses a fluid cushion of oil or air to reduce friction. The fluid cushion press is sometimes associated with the term "isobaric" and these presses operate to about 1000 psi. Pressure on the product is maintained directly by the oil or the air. Air has the advantage of providing a uniform pressure distribution over the entire width and length of the press.

Heat is transferred to thin products from the heated rollers or drums via the steel belts. With thicker products heat is transferred from heated pressure plates to the belts and then to the product. In gliding presses, heat is also transferred by heating the gliding oil itself. In roller bed presses, the rollers come into direct contact with the pressure-heating plates and the steel belts. With air cushion presses, heat flows from the drums to the belts to the product, and, by creating a turbulence in the air cushion itself, heat transfer is accomplished relatively efficiently. Also, heat transfer increases with rising pressure.

Another advantage of the double band press is that the product may be heated first and then cooled with both events occurring while the product is maintained under pressure. Heating and cooling plates may be separately located one after the other in line. The steel belts are cooled in the second part of the press and these cooled belts transfer heat energy from the product to the cooling system fairly efficiently.

Continuous press machines fitting the description provided hereinabove are sold by Hymmen GmbH of Bielefeld, Germany (U.S. office: Hymmen International, Inc. of Duluth, Ga.) as models ISR and HPL. These are double belt presses and also appear under such trademarks as ISO-PRESS and ISOROLL. Typically they have been used to produce relatively thick laminates, primarily for the furniture industry.

Even though fuel cell fluid flow field plates are known, as are their present manufacturing techniques, improvements are still needed to increase manufacturing efficiency, improve quality and lower cost.

BRIEF SUMMARY OF THE INVENTION

The present invention relates to a process for manufacturing fuel cell plates with increased efficiency, improved quality and lower cost. What is described here is a process for making fuel cell plates comprising in combination the steps of providing a continuous press with a movable belt, dispensing a sifted material onto the belt, leveling the material, removing air from the material, subjecting the material to pressure and heat, and indenting the material with a predetermined pattern.

An object of the present invention is to provide an efficient manufacturing apparatus and process for making fuel cell plates. A further aim of the present invention is to provide an efficient and cost effective method and apparatus for making indentations in resin impregnated graphite material.

A more complete understanding of the present invention and other objects, aspects, aims and advantages thereof will be gained from a consideration of the following description of the preferred embodiments read in conjunction with the accompanying drawings provided herein.

BRIEF DESCRIPTION OF THE SEVERAL VIEW OF THE DRAWING

DETAILED DESCRIPTION OF THE INVENTION

Figure 1:
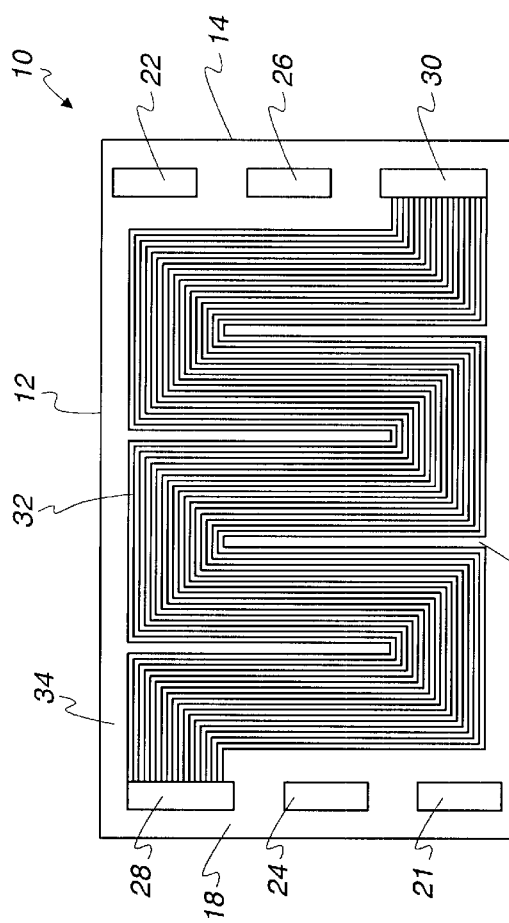
FIG. 1 is a diagrammatic plan view of a fluid flow field plate for a fuel cell.

While the present invention is open to various modifications and alternative constructions, the preferred embodiment shown in the drawings will be described herein in detail. It is understood, however, that there is no intention to limit the invention to the particular form disclosed. On the contrary, the intention is to cover all modifications, equivalent structures and methods, and alternative constructions falling within the spirit and scope of the invention as expressed in the appended claims.

Referring now to FIG. 1, there is illustrated a rectangular fluid flow field plate 10, the plate being formed of a specific formulation of resin impregnated graphite material. The material may be purchased from the Institute of Gas Technology (IGT) or obtained by license from IGT. The plate has four sides 12, 14, 16, 18, a top surface 20 and a bottom surface (not shown). Typically such plates have a thickness range of about 0.050 inches to 0.100 inches. It is noted that the plate may have another shape in plan view, such as round, square or hexagon. The plate includes hydrogen gas inlet and outlet openings 21, 22, coolant inlet and outlet openings 24, 26 and oxygen gas inlet and outlet openings 28, 30.

For purposes of illustration, the surface of a fluid flow field plate for an oxidant is shown. A plurality or series of parallel gas flow channels generally designated 32 extend between the two oxygen openings 28, 30. Typically, the channels have a depth range of about 0.010 to 0.030 inches. A flat perimeter region 34 is provided for sealing purposes. Generally, a residential PEM stack is about 8 inches wide by 12 inches long. This same size may also be used for a vehicle stack, or size may vary according to the design parameters chosen and the type of fuel cell. Plates for fuel and coolant may be made of the same material and have the same dimensions or they may differ in size and geometry based on function and design. Also, a single plate may have oxidant channels in one main surface and coolant channels in the opposite main surface. The primary requirements for a fuel cell plate are to have good electrical conductivity and to include resin so that the plate may be molded. By way of further example U.S. Pat. No. 5,942,347 assigned to IGT and incorporated herein by reference describes a fuel cell plate. Other companies, such as Ballard, Plug Power, H Power and International Fuel Cells also have patents describing fuel cell plates. Information regarding these companies and their products are readily available both on-line and from those skilled in the art.

It is to be further understood that plate and channel sizes and shapes vary greatly as a function of individual design determinations, electrical requirements and end use, i.e., stationary, vehicular or portable applications.

Figure 2:
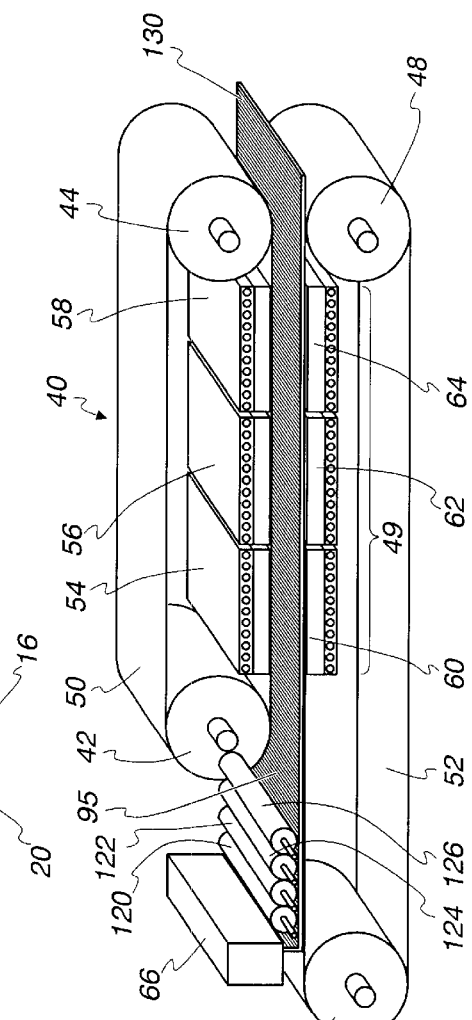
FIG. 2 is a diagrammatic isometric view of a double band press for making fuel cell plates.

Referring now to FIG. 2, a press for making fuel cell plates of the present invention is shown. The press 40 includes a pair of upper rollers 42, 44 and a pair of lower rollers 46, 48. The upper roller 42 and the lower roller 44 may be oil heated. Typically the rollers are about 31.5 inches in diameter and about 51 inches long. Around each pair of rollers is a steel belt, an upper patterned belt 50 is mounted around the upper rollers 42, 44 and a lower patterned belt 52 is mounted around the lower rollers 46, 48. Heat and pressure are applied in a portion of the press referred to as the reaction zone 49. Within the reactions zone are means for applying pressure and heat, such as three upper matched pressure sections 54, 56, 58 and three lower matched pressure sections 60, 62, 64. Each section is about 39 inches long and approximately 51 inches wide. Heat and pressure may be applied by other means as is well known by those skilled in the press art. Also, it is understood that the dimensions set forth are for existing presses such as those manufactured by Hymmen but press may be enlarged if found desirable.

Figure 3:
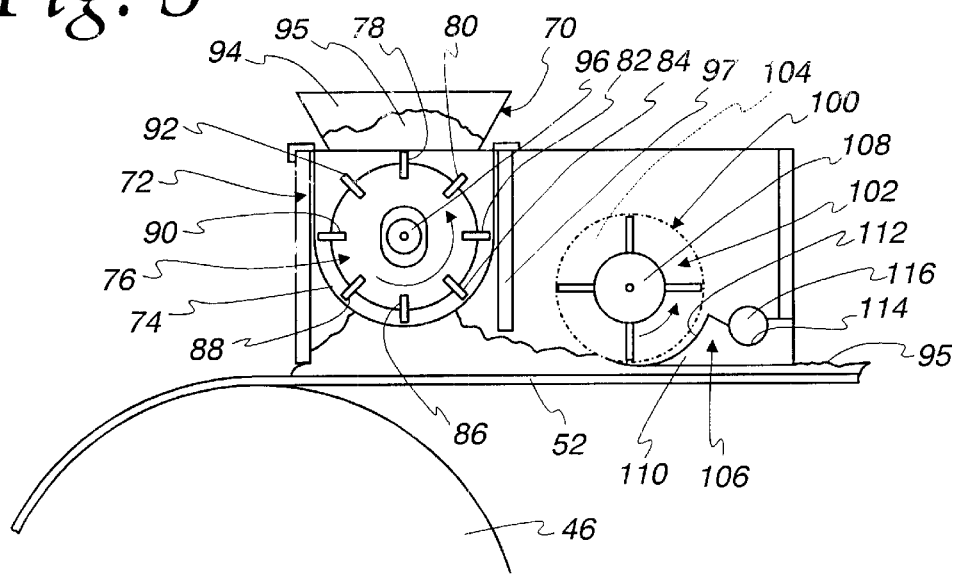
FIG. 3 is a diagrammatic elevation view of sifter and leveler machines that are part of the press shown in FIG. 2.

Mounted to the press 40 and located at the upstream position is a hopper-sifter and leveler apparatus 66 shown as a box in FIG. 2, and explained in detail in relation to FIG. 3. The hopper-sifter apparatus 70, FIG. 3, includes a frame 72 to which is mounted a mesh screen 74. Adjustably mounted to the frame is a sifter wheel 76 with stainless steel scrapper blades, 78, 80, 82, 84, 86, 88, 90, 92. A hopper 94 mounted to the frame above the sifter wheel. The special material 95 is deposited into the hopper and the sifter wheel rotates in a counter clockwise direction on a shaft 96. The wheel is vertically adjustable and places about ten pounds per linear inch on the screen. With the current formulation of IGT material, the screen is about a twenty mesh size. The rotating wheel 76 spreads and moves the material through the screen where it is deposited on the lower belt 52. A portion 97 of the frame 72 may act as a rough leveler of the material on the belt. For a press speed of about six feet per minute, the sifter wheel 76 has a speed of about sixty rpm. More than the pre-press height is deposited on the belt, with the expectation that the excess will be shaved off as will be explained.

As the belt moves downstream, the material is operatively engaged by a leveler apparatus 100. The leveler is also mounted to the frame 72 and thereby to the press 40. The leveler includes a rotatable brush 102 with fibrous bristles 104 and a blade 106. The brush rotates about a shaft 108 in a counterclockwise direction so as to "sweep" the material against the blade 106. The blade includes a blade end 110 and a curved portion 112. The blade also includes a depression 114 in which rotates an auger 116. The auger transports the excess material to a collection tray (not shown) or directly back to the hopper 94. The brush and blade limit the height of the material 95 to its "free" height. This free height is a function of the final thickness of the formed plate, and for example, may be from about 0.075 to 0.250 inches.

As mentioned earlier, the lower roller 46 may be heated so that the temperature of the material 95 is raised by heat transfer from the lower roller through the lower belt to the material riding on the belt. Before entering the reaction zone 49, FIG. 2, the material is engaged by at least one roller which squeezes out air within the material. As shown, four–five inch diameter rollers 120, 122, 124, 126 are mounted to the press 40. As the material passes under each roller, air is squeezed out. The pre-reaction zone height of the material may be within the range of about 0.055 to 0.125 inches. The rollers generally are free floating and press downward with about ten pounds per linear inch of force. After emerging from the reaction zone 49, the finished product 130 may have a height or thickness in a range from about 0.050 inches to about 0.100 inches. Generally, the free powder height is about two to three times that of the finished plate product. One or more of the air removing rollers may be heated and thus act as an additional heating station to supplement the heated upper roller 42 and the heated lower roller 46. After leaving the reaction zone, the product is cooled, punched, separated and then packaged.

The temperature in the reaction zone is set to the curing temperature of the resin used. Generally, this is between 300° and 400° F. The pressure will typically vary between about 50 and 1000 psi, the pressure being a function of the plate to be formed. For example, current plates vary from a density of about 1.2 g/cc to about 1.9 g/cc and in size. A phenol resin cures at about 330° F., at a pressure of 50 to 1,000 psi and curing time is about 90 seconds. The cure time translates to a press speed of about six feet per minute.

The belts 50, 52 have patterns to be impressed into the material, such as the pattern shown in FIG. 1. The belts are pressed together in the reaction zone. The belts may be made using a process described in U.S. Pat. Nos. 4,478,769 and 6,015,214.

The upper and lower belts 50, 52 are formed with the pattern to be embossed upon the main surfaces of the plates. By having the plates indented on a continuing basis in a continuous press, the efficiency of the manufacturing process is greatly enhanced and the costs involved greatly reduced. This is extremely important in the evolution of fuel cells to ensure their wide use and economic viability.

Figure 4:
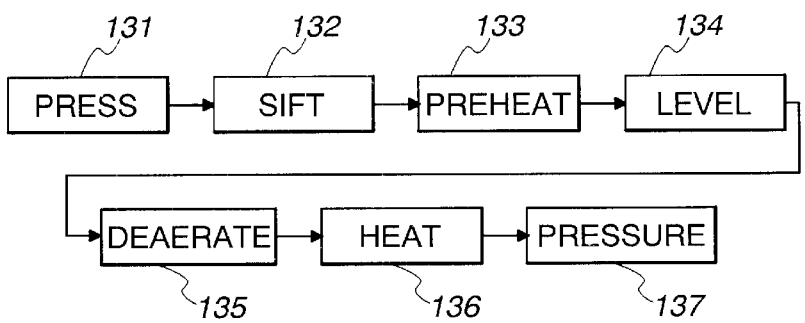
FIG. 4 is a chart of a process for making fuel cell plates.

In operation, the process for forming fuel cell plates is illustrated in FIG. 4. After providing a continuous press 131, the material to be formed is sifted 132, preheated 133, leveled 134 and deaerated 135. Thereafter cure heat 136 and pressure 137 are applied.

Figure 5:
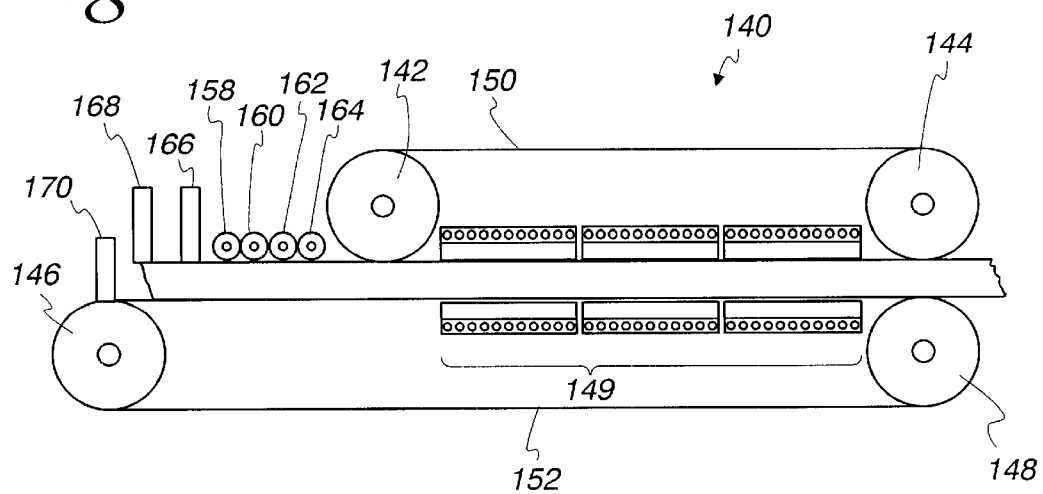
FIG. 5 is a diagrammatic elevation view of a press for making fuel cell plates.

Referring now to FIG. 5, there is illustrated another apparatus for making fuel cell plates. A continuous press 140 is shown having an upper pair of rollers 142, 144 and a lower pair of rollers 146, 148. Mounted to the pair of upper rollers is an upper belt 150, and mounted to the pair of lower rollers is a lower belt 152. Heat and pressure are applied in a reaction zone 149 as already explained above.

Figure 6:
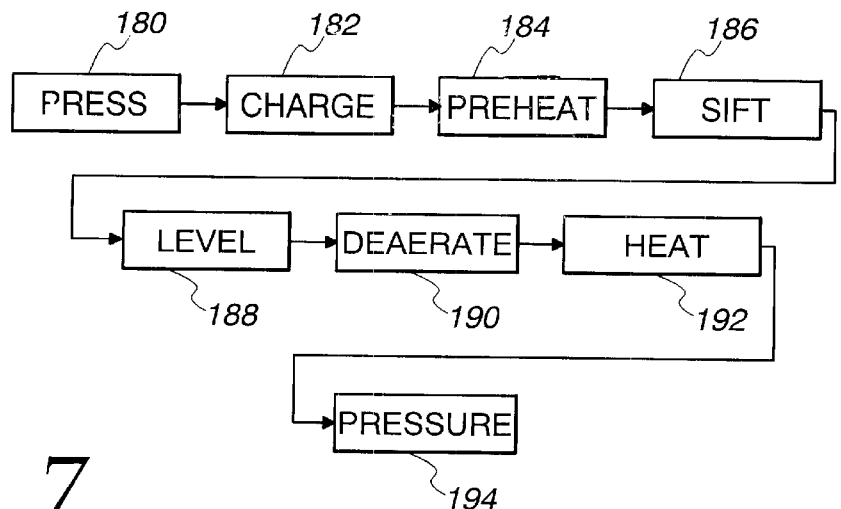
FIG. 6 is a chart of a process for making fuel cell plates.

Upstream of the upper roller 142 are air removing rollers 158, 160, 162, 164, a leveler 166 and a hopper-sifter 168. These are the same as the elements already described in relation to FIG. 2. Upstream of the sifter-hopper is an electrostatic charger 170. The electrostatic charger is well known to those skilled in the art. A suitable charger may be acquired from Power Coating Finishing Group, Incorporated of Stamford, Conn, Another process for making fuel cell plates is illustrated in FIG. 6 and includes the steps of providing the continuous press 180, electrostatically charging the lower belt 182, preheating the material 184, sifting the material to be deposited on the belt 186, leveling the material 188, removing air from the material 190, applying curing heat 192 and applying pressure 194.

Figure 7:
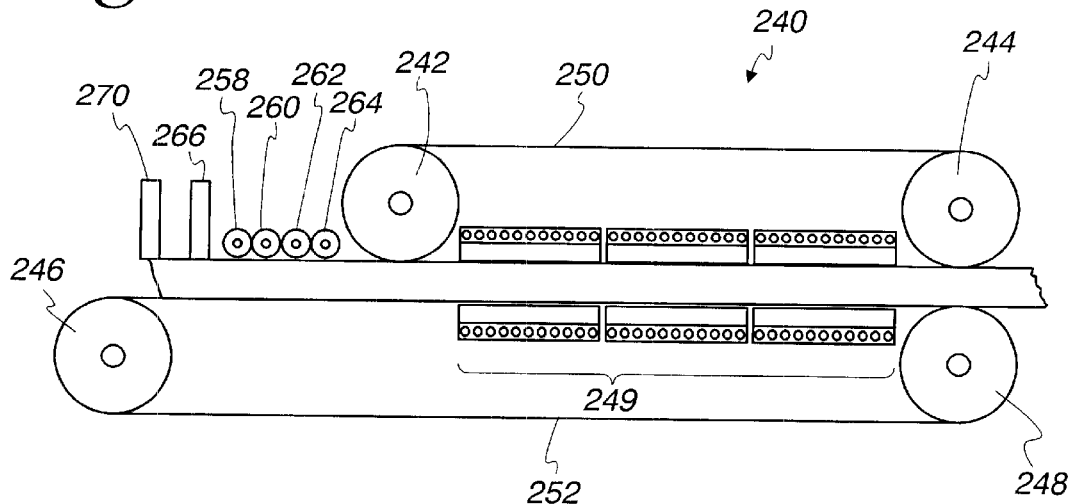
FIG. 7 is a diagrammatic elevation view of a press for making fuel cell plates.
Figure 8:
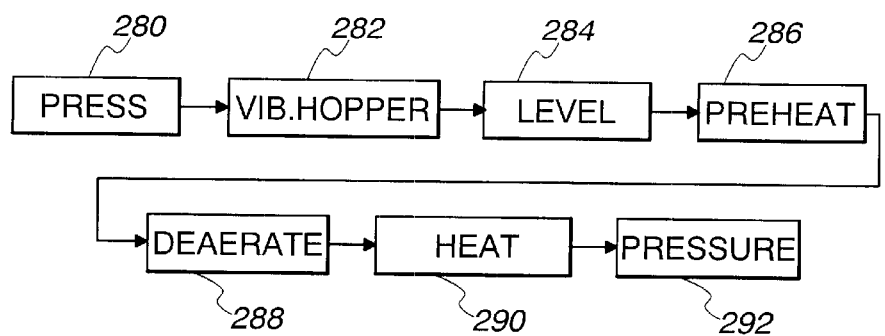
FIG. 8 is a chart of a process for making fuel cell plates.

Referring now to FIG. 7, there is illustrated another apparatus for making fuel cell plates. A continuous press 240 is shown having an upper pair of rollers 242, 244 and a lower pair of rollers 246, 248. Mounted to the upper rollers is an upper belt 250, and mounted to the lower rollers is a lower belt 252. Heat and pressure are applied in a reaction zone 249 as already explained above.

Upstream of the upper roller 242 are air removing rollers 258, 260, 262, 264, a leveler 266 and a hopper-vibrator 270. Hopper-vibrators are well known to those skilled in the art and one such device may be acquired from SolidsFlow, Inc., of Fort Mill, S.C.

Another process for making fuel cell plates includes the steps of providing a continuous press 280, using a vibrating hopper to deposit material on a belt of the press 282, leveling the material 284, preheating the material 286, removing air from the material 288, applying cure heat 290 and applying pressure 292.

The processes are efficient and expedient, while the apparatuses are reliable, simple and relatively inexpensive.

The specification describes in detail an embodiment of the present invention. Other modifications and variations will, under the doctrine of equivalents, come within the scope of the appended claims. For example, presses having somewhat different geometries and/or different dimensions are considered equivalent structures. Different material may affect pressure and temperature as well as process speed. Further, different plate densities and geometries may also affect the apparatus and process. Still other alternatives will also be equivalent as will many new technologies. There is no desire or intention here to limit in any way the application of the doctrine of equivalents.

What is claimed is:

1. A process for making fuel cell plates comprising in combination the steps of:

providing a continuous press with a movable belt;

dispensing a sifted electrically conductive material onto said belt;

leveling said material;

removing air from said material;

subjecting said material to pressure and heat; and indenting said material with a pattern.

2. A process as claimed in claim 1 wherein:

said material is preheated during said air removing step.

3. A process as claimed in claim 2 wherein:

said material is preheated during said leveling step.

4. A process as claimed in claim 1 including the step of:

sifting said material with a mesh screen.

5. A process as claimed in claim 1 wherein:

said material has a cure temperature; and including the step of heating said material to said cure temperature during the application of pressure.

* * * * *